(12) United States Patent
Yasuhara et al.

(10) Patent No.: US 6,935,012 B2
(45) Date of Patent: Aug. 30, 2005

(54) DYNAMO ELECTRIC MACHINE AND METHOD OF MANUFACTURING THE SAME

(75) Inventors: Takashi Yasuhara, Yotsukaido (JP); Toshiaki Ueda, Urizura (JP); Yasuhiko Kimura, Hitachinaka (JP); Sanshiro Obara, Tokai (JP); Suetaro Shibukawa, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/914,284

(22) Filed: Aug. 10, 2004

(65) Prior Publication Data

US 2005/0012423 A1 Jan. 20, 2005

Related U.S. Application Data

(62) Division of application No. 09/943,360, filed on Aug. 31, 2001, now Pat. No. 6,791,227.

(30) Foreign Application Priority Data

Feb. 28, 2001 (JP) ........................................ 2001-053422

(51) Int. Cl.[7] ........................ H02K 15/04; H02K 15/06; H02K 15/085
(52) U.S. Cl. ........................... 29/596; 29/606; 310/201; 310/179
(58) Field of Search .......................... 29/596, 606, 868; 310/184, 179, 201, 214, 216, 254, 260

(56) References Cited

U.S. PATENT DOCUMENTS

| | | | | |
|---|---|---|---|---|
| 1,826,296 A | * | 10/1931 | Apple | 310/201 |
| 1,830,456 A | * | 11/1931 | Apple | 310/201 |
| 2,407,935 A | * | 9/1946 | Perfetti et al. | 310/201 |
| 3,566,171 A | * | 2/1971 | Tichy et al. | 310/180 |
| 3,675,058 A | * | 7/1972 | Beddows et al. | 310/71 |
| 3,749,950 A | * | 7/1973 | Lenz | 310/45 |
| 3,777,198 A | * | 12/1973 | Anderson et al. | 310/200 |
| 3,824,683 A | * | 7/1974 | Rhudy | 29/596 |
| 4,028,572 A | * | 6/1977 | Baltisberger | 310/201 |
| 4,207,482 A | * | 6/1980 | Neumeyer et al. | 310/45 |
| 4,635,350 A | * | 1/1987 | Olsen et al. | 29/598 |
| 4,760,296 A | * | 7/1988 | Johnston et al. | 310/45 |
| 5,066,881 A | * | 11/1991 | Elton et al. | 310/213 |
| 6,204,586 B1 | * | 3/2001 | Umeda et al. | 310/179 |
| 6,515,394 B2 | * | 2/2003 | Ueda et al. | 310/208 |
| 6,548,993 B1 | * | 4/2003 | Rutyna et al. | 323/288 |
| 2004/0055139 A1 | * | 3/2004 | Kuroyanagi et al. | 29/596 |
| 2004/0098856 A1 | * | 5/2004 | Kuroyanagi et al. | 29/596 |

FOREIGN PATENT DOCUMENTS

| | | |
|---|---|---|
| JP | 6-209535 | 7/1994 |
| JP | 8-298758 | 11/1996 |
| JP | 10-066314 | 3/1998 |

* cited by examiner

*Primary Examiner*—Darren Schuberg
*Assistant Examiner*—David W. Scheuermann
(74) *Attorney, Agent, or Firm*—Crowell & Moring LLP

(57) ABSTRACT

Each of a plurality of unit windings 41 is formed by being divided into a first winding section 42 having opened end portions and a second winding section 43, and the first winding section 42 is shaped in such a manner that a step in radial direction of a stator core 2 is formed between opposing side sections 46 and 47 and the opened end sections are bent in the crossing over direction of the winding so that open ends 443 and 444 of the opened end sections 44 oppose each other in the radial direction of the stator core 2, then the open ends 443 and 444 are connected by winding conductor pieces 431 and 432 of the second winding section to complete the unit winding 41, thereby, end sections of a stator winding are shortened and a small size dynamo electric machine is realized.

6 Claims, 4 Drawing Sheets

DYNAMO ELECTRIC MACHINE AND METHOD OF MANUFACTURING THE SAME

This application is a division of application Ser. No. 09/943,360, filed Aug. 31, 2001, now U.S. Pat. No. 6,791,227.

BACKGROUND OF THE INVENTION

1. Field of the Invention

The present invention relates to a dynamo electric machine and a method of manufacturing the same, and, in particular, relates to a dynamo electric machine which is suitable for size reduction and a method of manufacturing the same.

2. Conventional Art

As, for example, disclosed in JP-A-10-66314 (1998), JP-A-8-298756 (1996) and JP(PCT)-A-10-507057 (1998), a stator winding of a conventional dynamo electric machine is constituted in such a manner that a plurality of unit windings are manufactured in advance by molding a winding conductor wound in a plurality of times in a predetermined shape (for example, a hexagonal shape) and are disposed into a plurality of slots in a stator core so that each of the unit windings crosses over the plurality of slots. Further, as disclosed in JP-A-6-209535 (1994), each of a plurality of unit windings which constitutes the stator winding is constituted by two parts one as an in-slot coil and the other as an inter slot crossover coil.

The above referred to crossing over amount of the unit winding is determined based on the number of poles of the stator, therefore, the length of the end section of the unit winding is determined by the magnitude of the crossing over amount. When the number of poles of the stator is large, the amount of crossing over of the unit winding generally decreases, therefore, the length of the end section of the unit winding is shortened in comparison with a stator having a small number of poles. Further, the length of the end section of the unit winding can be shortened by a certain degree by improving the shape of a portion corresponding to the end section of the unit winding of a winding frame used when winding the winding conductor.

However, when the length of the end section of the unit winding is greatly shortened, the disposing work of the winding conductor into slots of the stator core is disturbed. Therefore, the following measure is conceived, in that at the time of disposing the unit winding while limiting the length shortening of the end section of the unit winding so as not to disturb the disposing work, the unit winding are disposed into the slots of the stator core, and after completing the disposing of all of the unit windings the respective sections of the unit windings are forcedly shaped to shorten the same.

However, such manufacturing method requires a large mechanical force to shape the end sections of the unit windings, further, when shaping the end sections of the unit windings, such as an insulating member inserted in the slots of the stator core and an enamel insulative coating applied over the surface of the winding conductor may be damaged which likely causes to lower the break down voltage of the stator and to decrease the performance of the dynamo electric machine concerned. Still further, the amount of the forced shortening of the end sections of the unit winding is limited, therefore, it is impossible to expect a significant shortening of the end section of the unit winding with such measure.

With regard to the above problem, in the former prior art referred to above, it is impossible to shorten the length of the end section of the unit winding while preventing disturbance at the time of disposing work of the winding conductor, because the unit windings are shaped in advance. Further, the latter prior art referred to above takes no account of the significant shortening of the length of the end sections by shaping the end sections of the unit windings.

SUMMARY OF THE INVENTION

An object of the present invention is to provide a size reduced dynamo electric machine by shortening the end section of the stator winding.

Another object of the present invention is to provide a method of manufacturing a dynamo electric machine which can shorten the end section of the stator winding.

Still another object of the present invention is to provide a dynamo electric machine of which insulating property can be enhanced and a method of manufacturing the same.

A further object of the present invention is to provide a dynamo electric machine of which cooling efficiency at the end section of the stator winding can be enhanced and a method of manufacturing the same.

One of the features of the present invention is that each of a plurality of unit windings constituting the stator winding is formed by dividing at least two winding sections. More specifically, each of a plurality of unit windings constituting the stator winding is formed by dividing into a first winding section of which one of end sections is opened, opposing side sections are shaped so as to form a step in the radial direction of the stator core, the open ends of the opened end section face each other in the radial direction of the stator core and the opened end section is bent in a crossing over direction of the unit winding, and a second winding section connecting the open ends of the first winding section.

Herein, the end sections of the unit winding imply portions in the unit winding which project from the both end portions in axial direction of the stator core to the outside in the axial direction of the stator core and are called sometimes as a coil end portion. The side sections of the unit winding imply portions in the unit winding which are disposed in the slots of the stator core and are called sometimes as a coil side portion.

In the present invention, the stator winding is constituted by disposing a plurality of unit windings in a plurality of slots in the stator core in such a manner that one of two side sections of a unit winding is disposed in a slot other than a slot where the other side section of the unit winding is disposed while crossing over a plurality of slots. Namely, the stator winding is constituted by a so called distributed winding. In such instance, in the present invention, the stator winding is constituted by repeating the following process by the number of the unit windings.

The first winding section is formed in advance in such a manner that a plurality of winding conductors laminated in a straight shape are twisted at the midway thereof so that the width between the two side sections thereof crosses over a plurality of slots, a step is formed between the two side sections in the radial direction of the stator core and straight shaped open ends are formed at one of two end sections. Subsequently, the two open ends of the first winding section are inserted into two slots from one side of both ends in the axial direction of the stator core. Then, the straight shaped open ends of the first winding section which is projected from the other side of both ends in the axial direction of the stator core are bent in the crossing over direction of the unit winding so that the open ends face each other in the radial direction of the stator core. Finally, the open ends of the opened end section of the first winding section are connected by a winding conductor piece constituting the second winding section.

When connecting the opened end section of the first winding section by a winding conductor piece constituting the second winding section, in order to form a winding conductor having a plurality of turns among at least two winding conductors constituting the first winding section one of the open ends of one winding conductor and the other open end of the other winding conductor are connected by fastening therebetween the winding conductor pieces constituting the second winding section and the same operation is performed depending on the number of winding conductors in the unit winding. The unit winding is constituted by forming from a lamination of a plurality of flat shaped winding conductors.

As a result, in each of the slots of the stator core, a plurality of unit windings are disposed in such a manner that unit windings having different crossing over directions are piled in a slot in its depth direction, the laminating direction of the winding conductors constituting a unit winding is in the latitudinal direction of the slot and a plurality of unit windings are disposed in a slot. At this instance, the respective opened end sections of the plurality of unit windings are formed in such a manner that two portions which project from an end in the axial direction of the stator core to the outside in the axial direction of the stator core are bent in the crossing over direction of the unit winding, the two portions bent in the crossing over direction of the unit winding are stepped in the radial direction of the stator core and twisted portions of the two portions bent in the crossing over direction of the unit winding are extended in the radial direction of the stator core. Further, the end sections at the opposite sides of the respective opened end sections of the plurality of the unit windings are shaped in advance when forming the first winding section so as to have the same shape as the opened end sections as explained.

According to the present invention, since the unit winding is divided into at least two winding sections, in that divided into the first winding section having the opened end sections and the second winding section for connecting the open ends of the opened end sections of the first winding section, a conventional restriction subjected when disposing a unit winding formed by winding the winding conductor in a plurality of turns (for example, in a hexagonal shape), namely, the restriction that the length of the end section of the unit winding has to be kept within a length which prevents interference between the unit windings, is freed.

Moreover, according to the present invention, since the unit winding is constituted in such a manner that the opened end sections of the first winding section of which opposing side sections are stepped in the radial direction of the stator core are bent in the crossing over direction of the unit winding so as to oppose the opened end sections each other in the radial direction of the stator core as well as the open ends of the opened end sections of the first winding section are connected by the winding conductor piece constituting the second winding section, at least the opened end sections of the unit windings are formed in such a manner that two portions which project from the end in the axial direction of the stator core to the outside in the axial direction of the stator core are bent in the crossing over direction of the unit winding, the two portions bent in the crossing over direction of the unit winding are stepped in the radial direction of the stator core and twisted portions of the two portions bent in the crossing over direction of the unit winding are extended in the radial direction of the stator core, thereby, the opened end section of the unit winding is shortened by the amount of the twisted portion of the two bent portions in the crossing over direction of the unit winding.

Accordingly, in the present invention, the length of the respective end sections of a plurality of unit windings can be greatly shortened. Further, since the end sections of the respective closed end sections of the plurality of unit windings are formed in the same shape as those of the opened end sections, the length of the respective end sections of the plurality of the unit windings can be further shortened.

Further, according to the present invention, when shaping the end sections of the first winding section disposed in the slots of the stator core in a predetermined shape, the shaping is performed under a condition that the end section of the first winding section is opened, therefore, no large mechanical force is required therefor, therefore, a possibility of damaging the insulating member inserted in the slots of the stator core and the insulative coating applied over the surface of the winding conductors is small.

Still further, according to the present invention, since the respective end sections of the plurality of the unit windings are formed and arranged orderly in such a manner that two portions which project from the end in the axial direction of the stator core to the outside in the axial direction of the stator core are bent in the crossing over direction of the unit winding, the two portions bent in the crossing over direction of the unit winding are stepped in the radial direction of the stator core and twisted portions of the two portions bent in the crossing over direction of the unit winding are extended in the radial direction of the stator core, a ventilation resistance to cooling wind can be reduced.

DETAILED DESCRIPTION OF THE PREFERRED EMBODIMENTS

Figure 1:
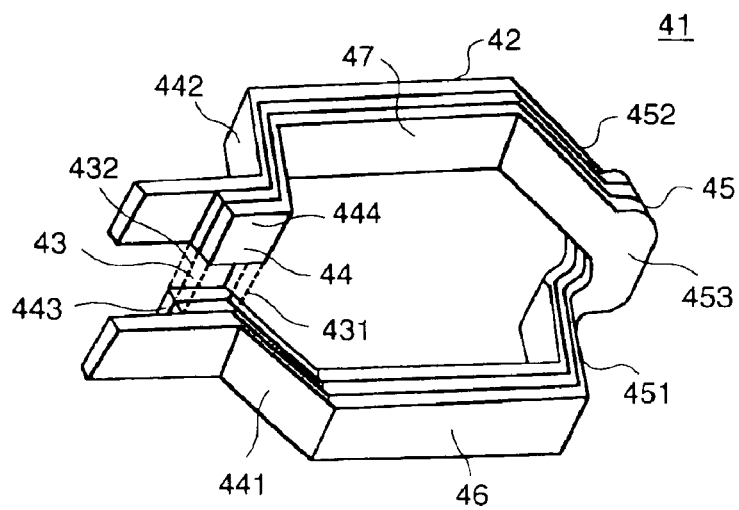
FIG. 1 is a perspective view showing a structure of a unit winding constituting a stator winding representing an embodiment of the present invention.
Figure 3:
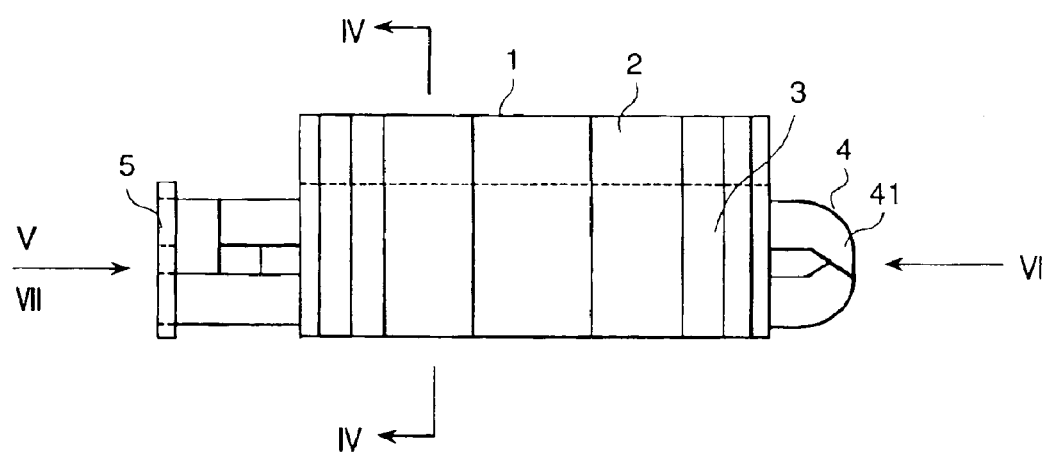
FIG. 3 is a cross sectional view showing a structure of a dynamo electric machine representing an embodiment of the present invention.

An embodiment of the present invention will be explained with reference to FIGS. 1 through 7. In the drawings 1 is a stator. The stator 1 comprises a stator core 2 and a stator winging (or "a stator coil"). The stator core 2 is a cylindrical shape formed by laminating a plurality of silicon steel sheets. Along the inner circumference of the stator core 2 a plurality of slots (or grooves) are formed which continuously extend in the axial direction as well as each has an opening portion 3a formed at the inner circumferential surface of the stator core 2.

In each of the slots 3 a unit winding (or "unit coil") 41 is disposed via a slot liner 3b, which is an insulating member for insulating between the stator core 2 and the unit winding 41. Respective winding sides of a unit winding 41 are disposed in separate two predetermined slots so as to cross over a predetermined number of slots (in the present embodiment two slots are crossed over). Namely, the present Embodiment employs a distributed winding for the stator winding 4.

Figure 5:
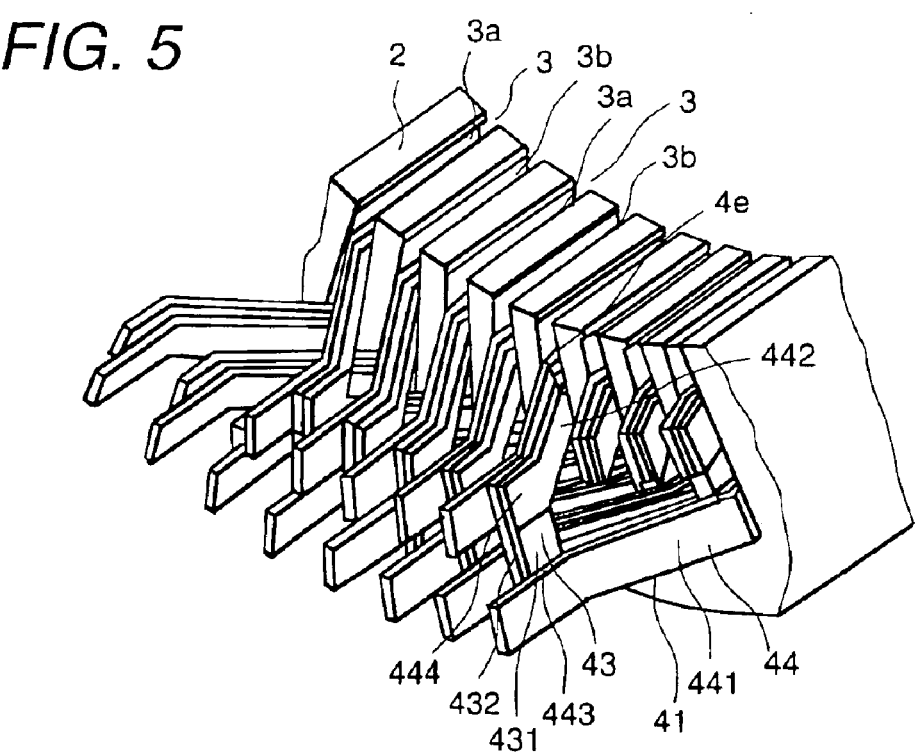
FIG. 5 is a perspective view seen along the arrowed direction V in FIG. 3 and shows a structure of one of the end sections of the stator winding at one side thereof.
Figure 6:
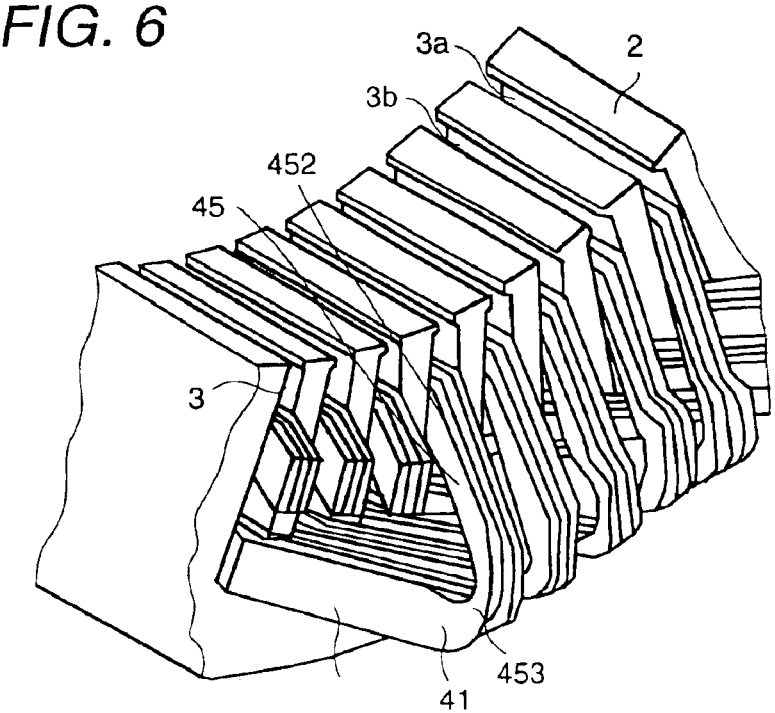
FIG. 6 is a perspective view seen along the arrowed direction VI in FIG. 3 and shows a structure of one of the end sections of the stator winding at the other side thereof.
Figure 7:
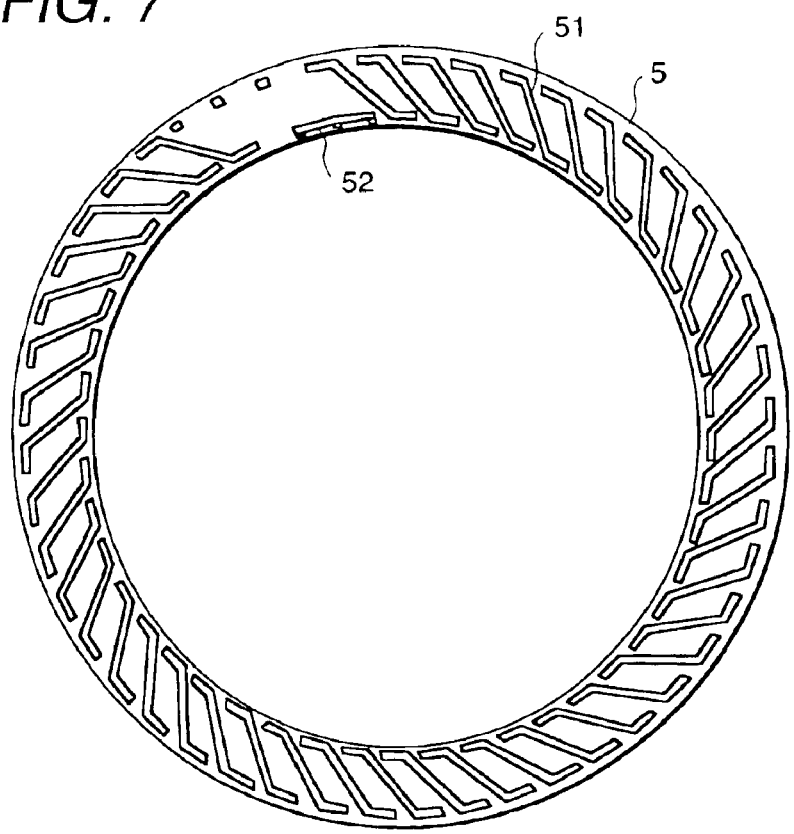
FIG. 7 is a cross sectional view seen along the arrowed direction VII in FIG. 3 and shows a structure of a connection ring.

Respective unit windings 41 project from both end portions in the axial direction of the stator core 2 to the outside in the axial direction of the stator core 2 as shown in FIGS. 5 and 6. In each of the slots 3 unit windings 41 having different crossing over directions are disposed while being piled in the depth direction (radial direction of the stator core 2) of the slot 3. One ends of the respective end portions of the unit windings 41 are connected for every U phase, V phase and W phase via a connecting ring 5 so as to constitute an electrical circuit for three phase Y connection.

The connecting ring 5 is integrally molded by inserting crossing over lines 51 and 52 into a heat resistant resin. The cross over lines 51 are for forming respective phases of U phase, V phase and W phase by connecting the end portions of two winding conductors. The crossing over line 52 is for forming a Y connection of the respective phases of U phase, V phase and W phase by connecting the last terminals of the unit windings for the respective phases. With this crossing over line 52 a neutral point is formed. The stator winding 4 is constituted by electrically connecting via the connecting ring 5 one ends of the unit windings disposed in the respective slots 3 so as to constitute an electric circuit of three phase Y connection.

Herein, the end sections of the unit winding 41 imply portions in the unit winding 41 which project from the both end portions in axial direction of the stator core 2 to the outside in the axial direction of the stator core 2 and are called sometimes as a coil end portion. The side sections of the unit winding 41 imply portions in the unit winding 41 which are disposed in the slots 3 of the stator core 2 and are called sometimes as a coil side portion.

In the inner circumferential side of the stator 1, a rotor of which illustration is omitted is disposed via a predetermined gap and supported by a bearing so as to permit rotation thereof. The structure of the rotor varies depending on kinds of dynamo electric machines. For example, an induction motor used for driving an electric car, a hybrid car and a fork lift uses a rotor in which a rotor winding constituted by aluminum or copper made conductor is disposed in a rotor core. Further, a synchronous motor likely applied for the above uses a rotor in which a permanent magnets are buried inside a rotor core or are provided on the outer circumferential surface of a rotor core. Further, a generator which is used for charging a battery mounted on a vehicle or for supplying power for a vehicle mounted load uses a rotor in which a rotor winding is disposed on the rotor core as well as permanent magnets are caught between claw shaped poles.

Now, the structure of the stator winding 4 of the present embodiment will be explained specifically. As has been explained above, the stator winding 4 is constituted by the unit windings 41 disposed in the respective slots. For the formation of the respective unit windings 41 a flat plate shaped winding conductor (or "coil conductor"), so called flat rectangular wire is used. In the present embodiment each of the unit windings 41 is formed by being divided into two winding sections by making use of the flat plate shaped winding conductor and finally (after being disposed in respective slots) a winding conductor having a plurality of turns is formed.

Figure 2A:
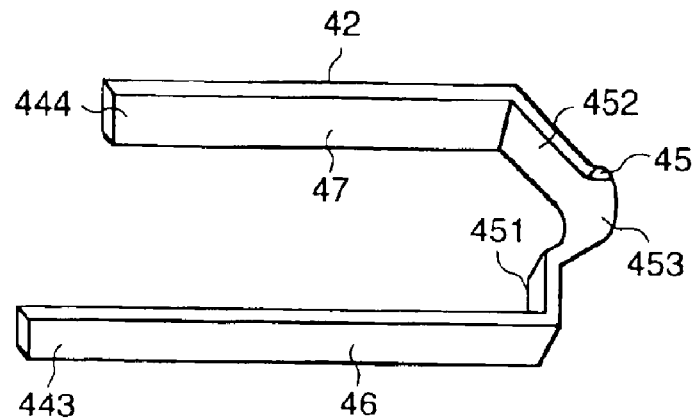
FIGS. 2(*a*), 2(*b*) and 2(*c*) are exploded views of a first winding section in the unit winding of FIG. 1, wherein FIG. 2(*a*) shows a structure of a winding conductor corresponding to a first turn of the unit winding, FIG. 2(*b*) shows a structure of a winding conductor corresponding to a second turn of the unit winding, and FIG. 2(*c*) shows a structure of a winding conductor corresponding to a third turn of the unit winding.
Figure 2B:
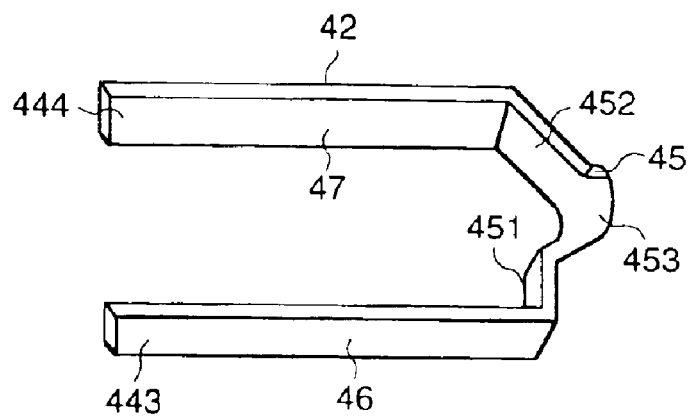
Figure 2C:
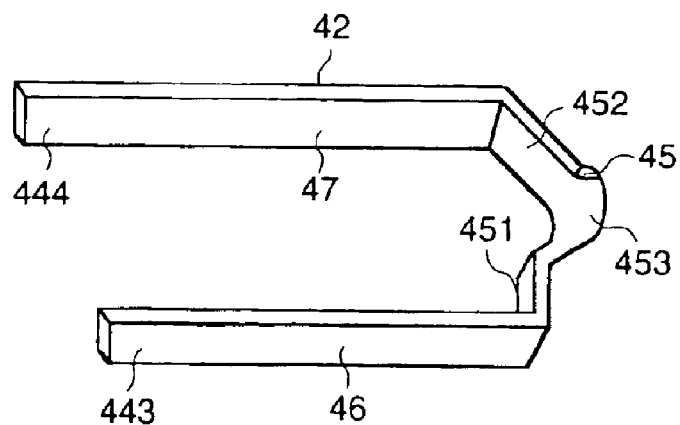
Figure 4:
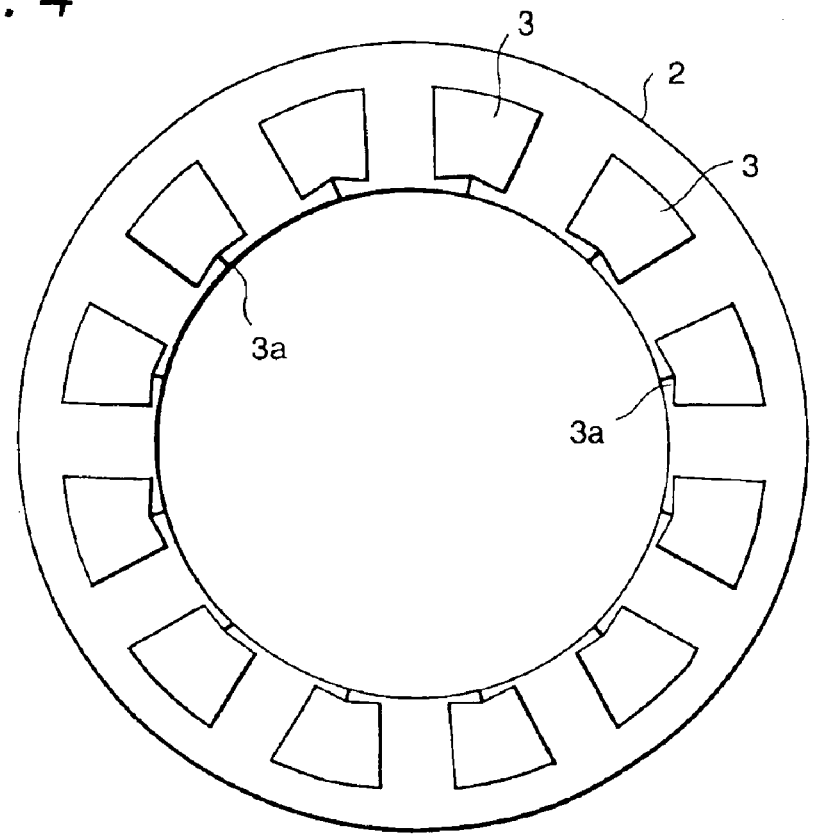
FIG. 4 is a cross sectional view taken along arrowed line IV—IV in FIG. 3.

As shown in FIG. 1, the unit winding 41 is formed by being divided into a first winding section 42 and a second winding section 43. The first winding section 42 is formed by laminating a plurality of winding conductors and is constituted by an opened end section 44, a closed end section 45 and side sections 46 and 47 extending in straight shape. In the present embodiment, as shown in FIGS. 2(a) thorough 2(c), the first winding section 42 is formed by laminating three winding conductors. FIG. 2(a) shows a structure of a winding conductor corresponding to a first turn in the unit winding 41 before inserting the same into a slot, FIG. 2(b) shows a structure of a winding conductor corresponding to a second turn in the unit winding 41 before inserting the same into a slot, and FIG. 2(c) shows a structure of a winding conductor corresponding to a third turn in the unit winding 41 before inserting the same into a slot.

Between the side sections 46 and 47 a step (a step nearly corresponding to the width size (the latitudinal size) of the flat rectangular wire) in radial direction of the stator core 2 is given. Thereby, when the unit winding 41 is disposed within slots 3, the side section 46 is arranged at the side of opening portion 3a in a slot 3 and the side section 47 is arranged at the bottom side (the opposite side from the opening portion 3a) in another slot 3.

The closed end section 45 is continuously formed by inclined sections 451 and 452 which are bent in the crossing over direction of the winding and a twisted section 453 which connects the end portions of the inclined sections 451 and 452 as well as extends in the radial direction of the stator core 2. Namely, the closed end section 45 is formed in such a manner that two portions thereof which project from the end portion in the axial direction of the stator core 2 to the outside in the axial direction of the stator core 2 are bent in the crossing over direction of the winding, a step in radial direction of the stator core 2 is formed between the two portions bent in the crossing over direction of the winding and the twisted section between the two portions bent in the crossing over direction of the winding extends in the radial direction of the stator core 2. Accordingly, when seen the closed end section 45 from the top thereof the shape of the closed end section 45 looks like one side of a hexagonal shape.

The opened end section 44 is formed by the inclined portions 441 and 442 bent in the crossing over direction of the winding. Open ends 443 and 444 are formed for the inclined portions 441 and 442. The open ends 443 and 444 face in the radial direction of the stator core 2 and the respective lengths thereof are different for every winding conductor. Namely, the open end 443 of the winding conductor corresponding to the first turn forms one side of lead-out portion of a unit winding 41 and the open end 444 forms a connecting portion with the open end 443 of the winding conductor corresponding to the second turn. The open end 444 of the winding conductor corresponding to the second turn forms a connecting portion with the open end 443 of the winding conductor corresponding to the third turn and the open end 444 thereof forms the other side of lead-out portion of the unit winding 41. Accordingly, as shown in FIGS. 2(a) through 2(c), lengths of respective winding conductors constituting the first winding section 42 are different.

The second winding section 43 is for connecting between the open ends 443 and 444 of the first winding section 42 and is constituted by two pieces of winding conductors. The winding conductor pieces 431 connects the open end 444 of the winding conductor corresponding to the first turn with the open end 443 of the winding conductor corresponding to the second turn. The winding conductor piece 432 connects the open end 444 of the winding conductor corresponding to the second turn with the open end of the winding conductor corresponding to the third turn. With this connection, the open ends 443 and 444 of the opened end section 44 of the first winding section 42 is closed and a unit winding 41 having three turn winding conductors is formed. Further, when seen the opened end section 44 of the first winding section 42 from the top, it looks like the other end portion of the hexagonal shape.

Now, a method of manufacturing the dynamo electric machine of the present embodiment, in particular, a manufacturing process of the stator winding 4 will be explained. At first, straight shaped lamination body which is formed by laminating three flat rectangular straight shaped copper wires applied with enamel insulative coating is twisted at the midway thereof around an axis in the latitudinal direction on a plane perpendicular to the lamination plane and a step (a step in the radial direction of the stator core 2) substantially corresponding to the width size (latitudinal side) of the flat rectangular wires is formed between the two side sections with reference to the twisted center. Subsequently, the side of the twisted portion of the lamination body is shaped by making use of a shaping jig not shown so that a crossing over width crossing over two slots is formed between the two side sections, namely so that the side sections 46 and 47, the inclined portions 451 and 452 and the twisted portion 453 of the closed end section 45 are formed. Through thus shaping as shown in FIGS. 2(a) through 2(c) the first winding section 42 having different lengths for every winding conductor and having a straight shaped opened end section 44 is formed.

Then, the straight shaped end sections 44 of the first winding section 42 are inserted from one of two ends in the axial direction of the stator core 2 into two slots 3 where the slot liner 3b is disposed. At this instance, the side section 46 of the first winding section 42 is arranged at the side of the opening portion 3a in a slot 3 and the side section 47 is arranged at the bottom side (the opposite side of the opening portion 3a) in another slot 3. Thereafter, the straight shaped end sections 44 of the first winding section 42 which project from the other side of the both ends in the axial direction of the stator core 2 are bent in the crossing over direction by making use of a shaping jig so that the open ends 443 and 444 face each other in the radial direction of the stator core 2. Through thus shaping, the first winding section 42 having the opened end section 44 including the inclined portions 441 and 442 is formed.

Subsequently, the winding conductor piece 431 constituting the second winding section 43 is inserted between the open end 444 of the winding conductor corresponding to the first turn and the open end 443 of the winding conductor corresponding to the second turn and connects between the both ends through a butt contact. Further, the winding conductor piece 432 constituting the second winding section 43 is inserted between the open end 444 of the winding conductor corresponding to the second turn and the open end 443 of the winding conductor corresponding to the third turn and connects between the both ends through a butt contact. Through the connection, the open ends 443 and 444 of the opened end section 44 of the first winding section 42 are closed and a unit winding 41 having the winding conductors of three turns is formed. Further, the connection between the open ends 443 and 44 of the opened end section 44 of the first winding section 42 with the winding conductor pieces 443 and 444 is performed with TIG welding. Further, for the connection of the respective open ends with the winding conductor pieces the enamel insulative coating applied at the connection portions is removed in advance.

Through repeating the above series of processes by the number of unit windings 41 to be disposed in the respective slots 3, in each of the slots 3 two unit windings 41 crossing over two slots 3 and in different crossing over direction are disposed in a laminated manner in its depth direction (in radial direction of the stator core 2).

Then, the respective end portions 44 of the unit windings 41 are connected via the connecting ring 5 for every U phase, V phase and W phase so as to constitute an electric circuit of three phase Y connection. More specifically, respective end portions of the adjacent two unit windings 41 are connected via the crossing over line 51 of the connecting ring 5, in that between one of the lead-out portions formed at the end portion 44 for one unit winding (the open end 443 of the winding conductor corresponding to the first turn of the unit winding 41) and the other lead-out portion formed at the end portion 44 for the other unit winding (the open end 444 of the winding conductor corresponding to the third turn of the unit winding). In other words, for every two slots 3, the lead-out portion of the end section 44 of a unit winding 41 arranged at the side of the opening portion 3a in one of two slots 3 (the open end 443 of the winding conductor corresponding to the first turn of the unit winding 41) and the lead-out portion of the end section 44 of another unit winding 41 arranged at the bottom side (the opposite side from the opening portion 3a) of the other slots 3 (the open end 444 of the winding conductor corresponding to the third turn of the unit winding 41) are connected via the crossing over line 51 of the connecting ring 5. Through repeating such connection by the number of the unit windings 41, the respective U, V and W phases are formed.

Subsequently, final ends of the unit windings 41 for the respective U, V and W phases are connected by the crossing over line 52 of the connecting ring 5. Through this connection an electric circuit of three phase Y connection is constituted and the stator winding 4 is completed. The connection between the respective crossing over lines 52 of the connecting ring 5 and the end sections of the unit windings 41 is performed through TIG welding. Further, for the connection of the crossing over lines 51 and 52 of the connecting ring 5 and the lead-out portions of the end sections of the unit windings 41 the enamel insulative coating applied at the connecting portions of the end sections 44 of the unit windings 41 is removed in advance.

According to the present embodiment as has been explained hitherto, since each of the unit windings 41 is divided into the first winding section 42 including the opened end section 44 and the second winding section 43 which connects between the open ends 443 and 444 of the opened end section 44 of the first winding section 42, a conventional restriction subjected when disposing a unit winding formed by winding the winding conductor in a plurality of turns (for example, in a hexagonal shape), namely, the restriction that the length of the end section of the unit winding has to be kept within a length which prevents interference between the unit windings is freed.

Moreover, according to the present embodiment, since the unit winding 41 is constituted in such a manner that the opened end sections 44 of the first winding section 42 are bent in the crossing over direction so that the open ends 443 and 444 of the opened end section 44 of the first winding section 42 which is shaped so that a step in the radial direction of the stator core 2 is formed between the opposing side sections 46 and 47 oppose each other in the radial direction of the stator core 2 as well as the open ends 443 and 444 of the opened end section 44 of the first winding section 42 are connected by the winding conductor pieces 431 and 432 constituting the second winding section 43, one side of the end sections of the unit winding (at the opened end section 44 of the first winding section 42) is shaped in such a manner that the two portions which project from the end portion in axial direction of the stator core 2 to the outside in the axial direction of the stator core 2 are bent in the crossing over direction of the winding, a step in radial direction of the stator core 2 is formed between the two portions bent in the crossing direction and the twisted portion between the two portions bent in the crossing over direction of the winding extends in the radial direction of the stator core 2, thereby, the length of the one side of the end sections of the unit winding 41 is determined by the distance from the end portion in the axial direction of the stator core 2 to the open ends 443 and 444 of the inclined portions 441 and 442 of the opened end section 44 of the first winding section 42, the length corresponding to the twisted portions between two portions bent in the crossing over direction, namely, the portion corresponding to the second winding section 43, is shortened.

Therefore, according to the present embodiment, the length of the respective end sections of the unit windings 41 can be shortened, the size in the axial direction of the dynamo electric machine can be reduced, thereby, the size of the dynamo electric machine can be reduced. Further, according to the present embodiment, since the other side of the respective end sections of the unit windings 41 (the closed end sections of the first winding sections) is likely shaped to assume the same configuration as the one side of the respective end sections of the unit windings, like the one side of the respective end sections of the unit windings the other side of the respective end sections of the unit windings can be shortened by the amount corresponding to the twisted portion 453, thereby, the size of the dynamo electric machine can be further reduced. According to the present embodiment, the length of the respective end sections of the unit windings can be reduced about ½ of the conventional one, a significant size reduction and light weight of a dynamo electric machine can be achieved. Such dynamo electric machine is effective for an electric vehicle such as an electric car, a hybrid car and a battery type fork lift. Of course, the present dynamo electric machine is effective for a vehicle such as an ordinary gasoline car for enhancing fuel economy.

Further, according to the present embodiment, when shaping the opened end sections 44 of the first winding section 42 which is disposed in the respective slots 3 into a predetermined shape, the shaping into the predetermined shape is performed under a condition that the opened end section 44 of the first winding section 42 is opened, no large mechanical force is required for the shaping, therefore, a possibility of damaging the slot liners 3b inserted in the respective slots 3 and the enamel insulative coating applied over the surface of the winding conductors is small. As a result, according to the present embodiment, the insulating property of the dynamo electric machine can be enhanced as well as reliability of the dynamo electric machine can be enhanced.

Still further, according to the present embodiment, since the respective end sections of the unit windings 41 which are disposed in the respective slots 3 are shaped and arranged orderly in such a manner that the two portions which project from the end portion in the axial direction of the stator core 2 to the outside in the axial direction of the stator core 2 are bent in the crossing over direction of the winding, a step in the radial direction of the stator core 2 is formed between the two portions bent in the crossing over direction of the winding and the twisted portion between the two portions bent in the crossing over direction of the winding extends in the radial direction of the stator core 2, the ventilation resistance for cooling wind can be reduced. Moreover, through the use of the flat rectangular wires such advantage can be further enhanced. Therefore, according to the present embodiment, a cooling efficiency of the stator winding 4 can be enhanced and an enhanced output capacity of a dynamo electric machine can be achieved or alternatively further size reduction of the dynamo electric machine can be achieved. The present dynamo electric machine is effective for an electric vehicle requiring a high output capacity such as an electric car, a hybrid car and a battery type fork lift. Further, the present dynamo electric machine is effective for enhancing output capacity for a four wheel drive car using a motor.

Still further, according to the present invention, when disposing the respective unit windings 41 into the slots 3, the first winding section 42 constituting the unit winding 41 is inserted from one of the two end portions in the axial direction of the stator core 2, the opening portion 3a of the slot 3 is subjected to no restriction with regard to manufacturing method. Conventionally, since the unit winding is inserted from the opening portion of the slot, the size of the opening (the circumferential width of the opening portion in the stator core) was determined depending on the diameter of the unit winding and the workability therewith, moreover, the size was larger than that required in view of the performance. However, according to the present embodiment, the first winding section 42 constituting the unit winding 41 is inserted from one of the two end portions in the axial direction of the stator core 2, the opening portion 3a of the slot 3 is never subjected to a requirement with regard to manufacturing method and the size of the opening portion 3a of the slot 3 can be set at an optimum size in view of the performance of the dynamo electric machine. Therefore, according to the present embodiment the performance of the dynamo electric machine can be enhanced.

Still further, according to the present embodiment, since the length of the end sections of the stator winding 4 has been shortened as has been explained above, such as resistance and reactance of the stator winding 4 can be reduced. Therefore, the present embodiment is suitable for a dynamo electric machine meeting a specification of a large current and a low voltage.

According to the present invention, since the length of the respective end sections of a plurality of unit windings can be shortened significantly, the end sections of the stator winding can be shortened and the size of a dynamo electric machine can be reduced. Further, a method of a manufacturing a dynamo electric machine which can shorten the end sections of the stator winding can be produced. Further, according to the present invention, since a possibility of damaging an insulating member inserted in the slots of the stator core and an insulative coating applied over the surface of the winding conductors is small, an insulating property of a dynamo electric machine can be enhanced. Further, a method of manufacturing a dynamo electric machine which can enhance the insulating property of the dynamo electric can be provided. Still further, according to the present invention since a ventilation resistance for cooling wind at respective end sections of a plurality of unit windings can be reduced, cooling efficiency at the end sections of the stator winding can be enhanced. Further, a method of manufacturing a dynamo electric machine which can enhance cooling efficiency at the end sections of the stator winding can be provided.

What is claimed is:

1. A method of manufacturing a dynamo electric machine in which one of side sections of each of a plurality of unit windings is disposed in one of a plurality of slots formed on a stator core other than another slot in which the other side section thereof is disposed by crossing over a predetermined plurality of slots wherein a first winding section of the unit winding having a straight shaped open end sections at the one side thereof is formed in advance in such a manner that a laminate of a plurality of straight shaped winding conductors is twisted at the midway thereof to form a crossing over width between two side sections formed which permits to cross over a plurality of slots as well as to form a step in the radial direction of the stator core between the two side sections, two open ends of opened end sections of the first winding section are inserted into two of the plurality of slots from one of two ends in the axial direction of the stator core, the straight shape opened end sections of the first winding section which project from the other end portion in the axial direction of the stator core are bent in the crossing over direction of the winding so as to oppose the open ends in the radial direction of the stator core, the open ends of the opened end sections of the first winding section are connected by a winding conductor piece constituting a second winding section of the unit winding, and above series of steps is repeated by the number of unit windings to be disposed in the plurality of slots so as to constitute a stator winding.

2. A method of manufacturing the dynamo electric machine of claim 1, wherein the unit windings having different crossing over directions are disposed and laminated in each of the plurality of slots in its depth direction.

3. A method of manufacturing the dynamo electric machine of claim 1, wherein each of the plurality of unit windings is formed by laminating a plurality of flat plate shaped winding conductors.

4. A method of manufacturing the dynamo electric machine of claim 1, wherein each of the plurality of unit windings is disposed in one of the slots in such a manner that the laminating direction of the winding conductors coincides with the latitudinal direction of the slot.

5. A method of manufacturing the dynamo electric machine of claim 1, wherein each of the plurality of unit windings is constituted in such a manner that among at least two winding conductors constituting the first winding section one open end of one winding conductor and other open end of the other winding conductor are connected by inserting a winding conductor piece constituting the second winding section so that winding conductors having a plurality of turns are formed.

6. A method of manufacturing the dynamo electric machine of claim 1, wherein each of the plurality of unit windings is shaped in such a manner that the end section opposite from the opened end section has substantially the same shape as the opened end section.

* * * * *